H. G. FARR.
FIFTH WHEEL CONSTRUCTION.
APPLICATION FILED JUNE 4, 1915.

1,169,717.

Patented Jan. 25, 1916.
3 SHEETS—SHEET 1.

WITNESS
A. E. Hartwell.

INVENTOR.
Herman G. Farr.
BY Chapin & Co.
ATTORNEYS.

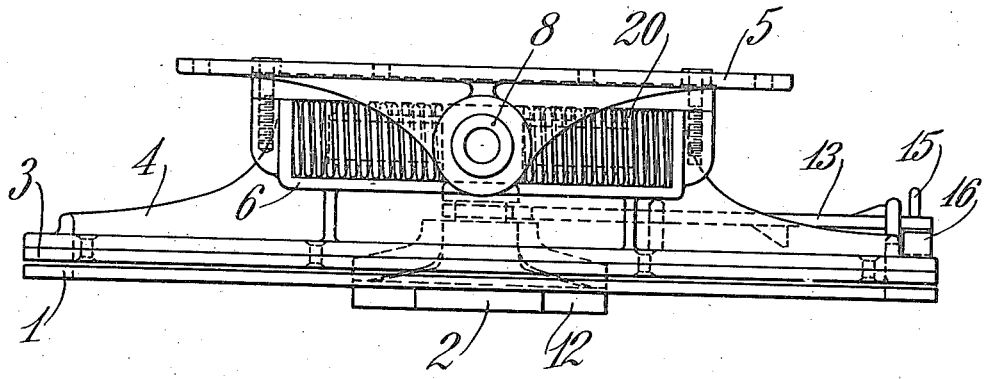
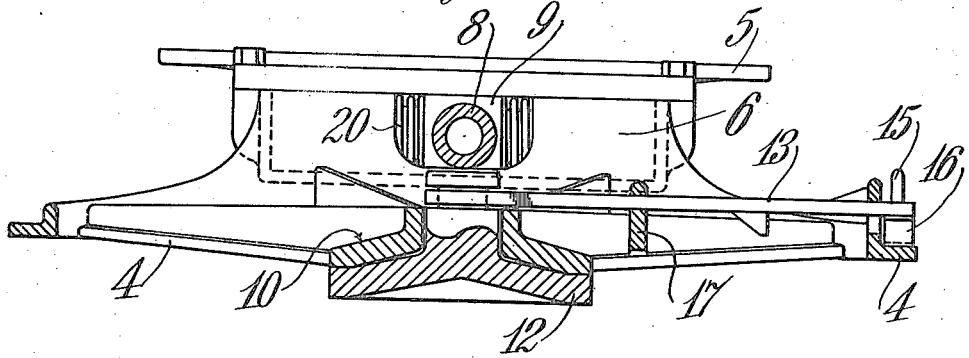

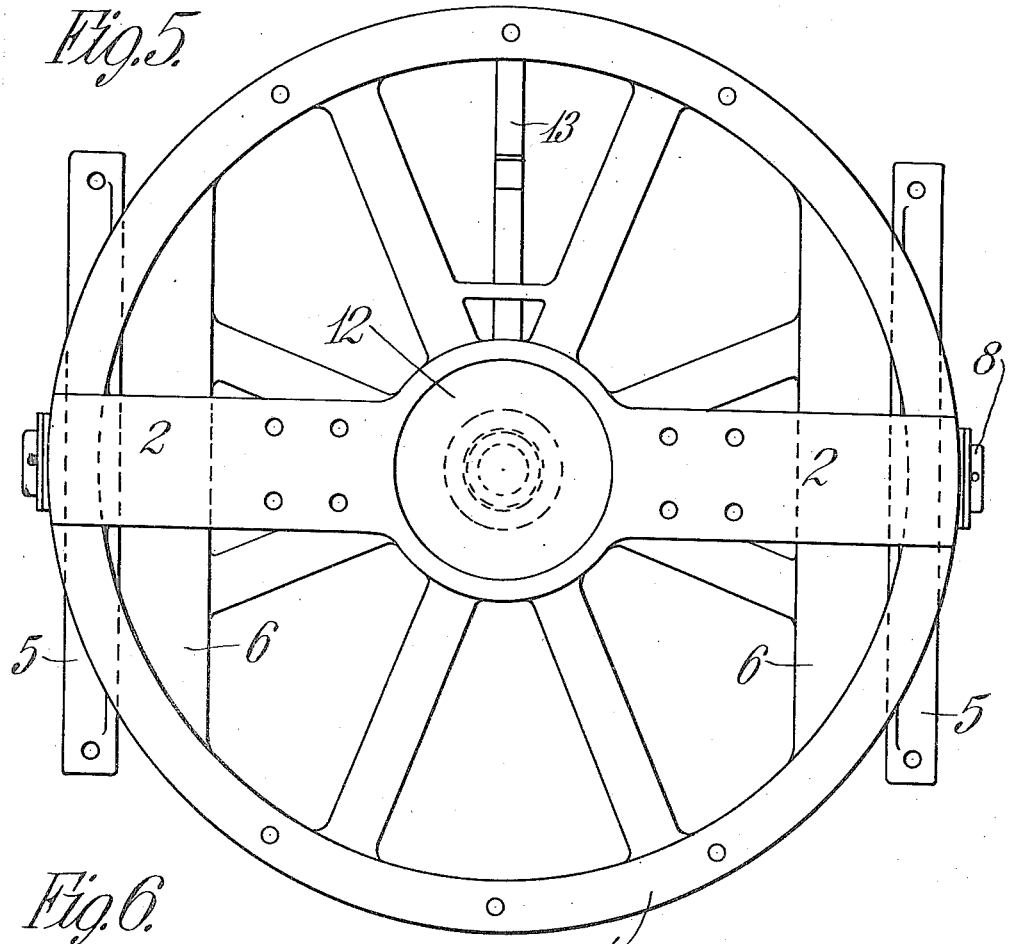
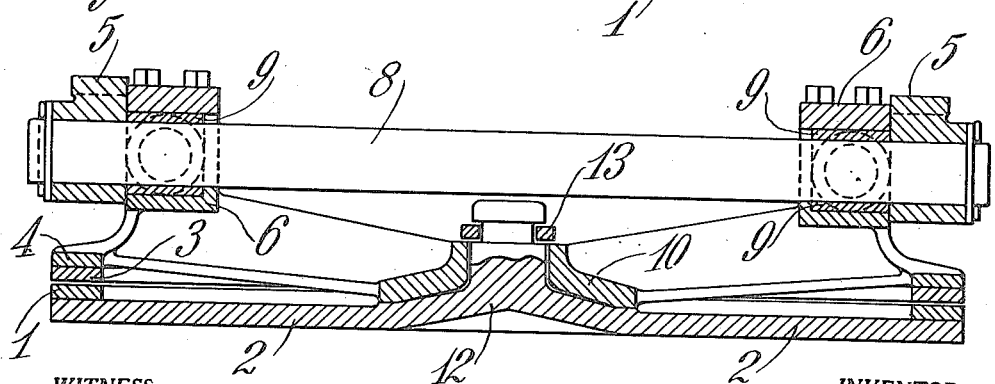

UNITED STATES PATENT OFFICE.

HERMAN G. FARR, OF SPRINGFIELD, MASSACHUSETTS, ASSIGNOR TO CHARLES H. MARTIN, OF SPRINGFIELD, MASSACHUSETTS.

FIFTH-WHEEL CONSTRUCTION.

1,169,717.                   Specification of Letters Patent.    Patented Jan. 25, 1916.

Application filed June 4, 1915.   Serial No. 32,076.

*To all whom it may concern:*

Be it known that I, HERMAN G. FARR, a citizen of the United States of America, residing in the city of Springfield, county of Hampden, and State of Massachusetts, have invented certain new and useful Improvements in Fifth-Wheel Construction, of which the following is a specification.

This invention relates to a fifth wheel construction and particularly to that class of devices designed for connecting a tractor and trailer combination in heavy hauling wherein a spring draw bar effect is desired and a rocking connection between vehicles is preferable.

The object of the invention is to provide a fifth wheel construction of the class described which is economical to manufacture and efficient in use and these objects are obtained by an improved arrangement of the parts and a special assembly all of which will be more clearly understood from the detailed description and generally defined in the annexed claims.

For the purpose of illustrating the preferred mode of constructing and using my invention, reference is made to the accompanying drawings.

Figure 1:
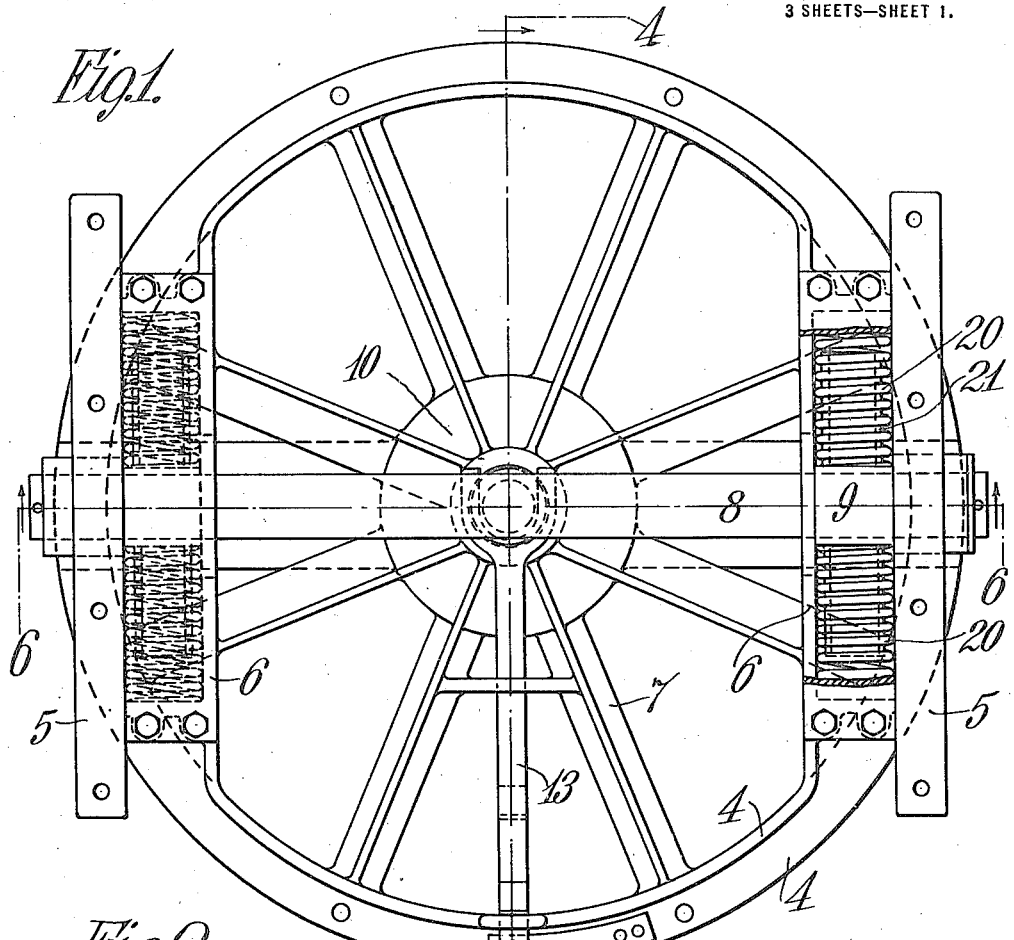
Figure 2:
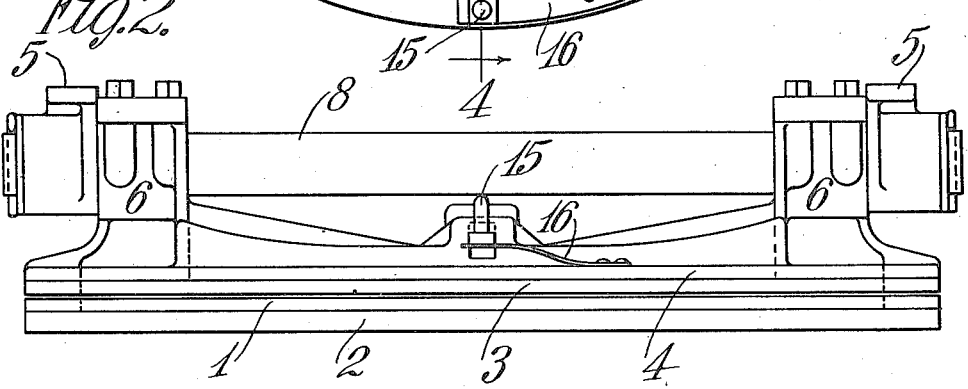

Figure 1 is a plan view of the assembled structure with a part broken away; Fig. 2 is a front view thereof; Fig. 3 is a side view of the same; Fig. 4 is a section on line 4—4 of Fig. 1 with certain parts removed; Fig. 5 is a plan view of the structure taken on the face opposite to that shown in Fig. 1; Fig. 6 is a section taken on line 6—6 of Fig. 1.

One of the circular fifth wheel members 1 has attached diametrically thereto a plate or casting 2. Centrally of this casting 2 is an integral king pin member 12 with a circumferentially slotted head member to receive the fork of the locking bar 13. The other circular fifth wheel member 3 is fastened to a supporting casting 4 which has spoke members 7 connecting its outer portions with the central portion 10 adapted to receive the member 12 (see Figs. 4 and 6). At opposite sides and horizontally of the casting 4 are parallel spring box portions 6, each adapted to receive a pair of springs 20 and permit the rock shaft 8 to pass through transversely of the box and between each pair of springs. The boxes are slotted to permit longitudinal play with respect thereto of the shaft 8. Mounted loosely on the shaft 8 and slidably arranged in each box is a casting 9. Extending from each side of this casting an integral portion 21 is provided around which the springs 20 are loosely coiled. In this construction then the springs bear against the end of the box and the squared side of casting 9. The open side of each box is preferably provided with a bolted-on cover. The springs are thus kept in alinement by portions 21 of casting 9 and the latter is confined in the box for movement with the shaft 8. Against the outer side of each box 6 and parallel thereto, a connecting plate 5 is loosely mounted by a suitable hub portion to shaft 8 and is held in place by a cotter pin on the shaft. These plates 5 are adapted for connection to either vehicle.

To apply the improved structure for use the connecting plates 5 are suitably fastened to one vehicle and casting 2 and its fifth wheel member 1 to the other vehicle. The king pin part 12 is moved with its vehicle to alinement with the central portion 12 adapted to receive it. The parts are then brought together and held in place by the bar 13. The latter is mounted to slide horizontally in casting 4 and has limiting stops as well as springs 16 to normally hold it in place.

When the parts are applied and the vehicles connected any sudden change in the speed of the vehicles will act to compress springs 20 on one side of shaft 8 to ease the relative change of momentum between vehicles. The projections 21 will abut the ends of the boxes to make a positive draft connection whenever the springs are compressed to a predetermined limit. The draw bar action or function is well known in a broad way and is particularly useful in road tractor and trailers where heavy loads on the trailer are drawn by an expensive tractor vehicle. It is well known that tractors are adapted for use with two or more trailer wagons; with this adaptation it is planned to use the tractor as a master truck for use with a number of trailers and thus keep the more expensive part of the equipment, the tractor, in continuous use as far as possible.

In an equipment of the character just mentioned, the initial cost is of course important but the efficiency of the device can not be sacrificed to a consideration of cost.

By my improved device and arrangement that part of the connecting means which is on one vehicle is extremely simple in construction, as for example parts 1 and 2, whereas that part on the other vehicle, while of simple and improved construction, embodies the more expensive operative elements which permit a transverse or fore and aft rock between the connected vehicles and certain improved detail operations. The result of my arrangement is to embody in the part of the connecting means on one vehicle practically the entire cost of said means. In this way the connecting means may be arranged with the costly part attached to the tractor and the coöperating and inexpensive part attached to the trailer. Since several trailers are used with one tractor it is clear that only the relatively inexpensive element of the invention needs to be duplicated. The tractor with its part, however, enables the full and efficient operation of the connecting means in the tractor combination with any of its trailers.

While the drawings show the expensive part of the equipment above and the inexpensive part below the arrangement of parts in use as above described will be just the reverse of that shown in the drawings. It is clear that the parts are interchangeable as to position or vehicle according to the use or arrangement desired.

The improved and simple arrangement of parts for the purpose desired will be set forth in the claims which define the scope of the invention.

What I claim is:

1. Tractor and trailer connecting apparatus, comprising, a circular member having parallel box portions along opposite sides thereof, a diametrically arranged rock shaft, shaft supporting members for the shaft slidably arranged in the boxes, springs between the sides of the supporting members and the ends of the boxes to normally hold the former in central position, and means fixed to the shaft to connect it to a vehicle.

2. Tractor and trailer connecting apparatus, comprising, a member adapted for permanent connection to one vehicle and having a king pin portion, a coöperating member having means to receive said portion to pivotally connect the members and on each side thereof box portions, slidably mounted shaft supporting members one in each box and provided with central projections on each side parallel to the boxes, springs loosely wound around the projections and bearing against the ends of the boxes and the sides of the supporting members, a transversely arranged rock shaft mounted in the supporting members to move therewith against the force of the springs and means to connect the shaft and the other vehicle.

3. Tractor and trailer connecting apparatus comprising a circular fifth wheel member having a transversely arranged member with a centrally positioned king pin portion all adapted to be connected to one vehicle and a coöperating circular fifth wheel member adapted to be connected to the other vehicle and having spoked thereto a central portion to receive the king pin portion, a pair of parallel bearing boxes, one fixed adjacent the circumference on opposite sides of the central portion, shaft supporting members slidably arranged one in each box, a transversely arranged rock shaft mounted in the supporting members and extending beyond the boxes, projections on the sides of each supporting member extending along the boxes, springs loosely mounted over the projections and abutting against the sides of the supporting members and the ends of the boxes to normally hold the shaft in central position, and parallel plates one fixed to each end of the shaft to attach the shaft for movement with the vehicle.

4. Tractor and trailer connecting apparatus, comprising relatively pivoted fifth wheel portions, one of which is provided with a pair of spring boxes, shaft supporting members slidably arranged in the boxes having projections thereon to abut the ends of the boxes and limit their movement therein, coiled springs loosely mounted over the projections and abutting the ends of the boxes and sides of the supporting members to normally hold the latter in central position, a transversely arranged rock shaft mounted at opposite ends in the supporting members to move therewith and adapted to connect the apparatus with one of the vehicles.

HERMAN G. FARR.